US010934433B2

(12) United States Patent
Jung et al.

(10) Patent No.: US 10,934,433 B2
(45) Date of Patent: *Mar. 2, 2021

(54) POLYAMIDE COMPOSITIONS COMPRISING A BLEND OF POLYAMIDE 6,6 AND AT LEAST ONE HIGH CHAIN-LENGTH POLYAMIDE, AND Al STEARATE, USE THEREOF, AND ARTICLES OBTAINED THEREFROM

(71) Applicant: Performance Polyamides, SAS, Paris (FR)

(72) Inventors: Jin-Kyung Jung, Seoul (KR); Elodie Seignobos, Saint Genis Laval (FR)

(73) Assignee: Performance Polyamides, SAS, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/534,135

(22) PCT Filed: Dec. 2, 2015

(86) PCT No.: PCT/EP2015/078335
§ 371 (c)(1),
(2) Date: Jun. 8, 2017

(87) PCT Pub. No.: WO2016/091676
PCT Pub. Date: Jun. 16, 2016

(65) Prior Publication Data
US 2017/0342266 A1    Nov. 30, 2017

(30) Foreign Application Priority Data
Dec. 12, 2014    (EP) .................................. 14197675

(51) Int. Cl.
*C08L 77/06*    (2006.01)
*C08K 5/098*    (2006.01)
*C08L 97/02*    (2006.01)
*C08K 7/14*    (2006.01)
*C08K 3/16*    (2006.01)
*C08K 3/014*    (2018.01)

(52) U.S. Cl.
CPC ............... *C08L 77/06* (2013.01); *C08K 3/16* (2013.01); *C08K 5/098* (2013.01); *C08K 7/14* (2013.01); *C08L 97/02* (2013.01); *C08K 3/014* (2018.01); *C08L 2201/08* (2013.01); *C08L 2205/025* (2013.01)

(58) Field of Classification Search
CPC ...... C08L 77/06; C08L 2205/02; C08K 5/098
USPC ...................................................... 525/432
See application file for complete search history.

(56) References Cited

U.S. PATENT DOCUMENTS

| 4,748,197 A * | 5/1988 | Cordova .................... C08J 5/06 427/386 |
| 4,804,703 A * | 2/1989 | Subramanian ......... C08K 3/346 524/444 |
| 4,861,838 A * | 8/1989 | Khanna ................ C08G 69/265 525/432 |
| 5,373,046 A * | 12/1994 | Okamura .................. C08J 3/226 524/413 |
| 7,202,298 B2 * | 4/2007 | Arakawa .................. C08K 7/14 524/494 |
| 8,273,431 B2 | 9/2012 | Otaki et al. |
| 8,580,899 B2 | 11/2013 | Dowe et al. |
| 8,785,534 B2 | 7/2014 | Klatt et al. |
| 10,301,469 B2 * | 5/2019 | Jung ....................... C08K 5/098 |
| 2008/0269375 A1 | 10/2008 | Park et al. |
| 2009/0105412 A1 * | 4/2009 | Martens ............... C08G 69/265 524/607 |
| 2013/0023613 A1 * | 1/2013 | Klatt ....................... C08L 77/02 524/255 |
| 2013/0172470 A1 * | 7/2013 | Chou ....................... C08L 77/06 524/504 |
| 2014/0088237 A1 | 3/2014 | Lima |
| 2014/0288220 A1 * | 9/2014 | Duncan .................... C08K 5/20 524/133 |
| 2014/0309367 A1 * | 10/2014 | Bradley ................. C08G 69/48 524/606 |

(Continued)

FOREIGN PATENT DOCUMENTS

| CN | 102834463 A | 12/2012 | |
| CN | 103827210 A | 5/2014 | |
| JP | 57212252 A * | 12/1982 | ............. C08L 77/00 |
| JP | 2008-144132 A | 6/2008 | |
| JP | 2014-526597 A | 10/2014 | |
| RU | 2412217 C2 | 2/2011 | |
| RU | 2441043 C2 | 1/2012 | |
| WO | WO-2013041594 A1 * | 3/2013 | ............. C08L 77/06 |
| WO | 2014/160564 A1 | 10/2014 | |

OTHER PUBLICATIONS

The machine translated English language equivalent of JP 57-212252 (1982, 3 pages).*

(Continued)

*Primary Examiner* — Brieann R Johnston
(74) *Attorney, Agent, or Firm* — Osha Bergman Watanabe & Burton LLP

(57) ABSTRACT

The present invention provides a polyamide composition comprising (a) at least one polyamide mixture formed from (i) at least one polyamide 6,6, the amount of amine end groups (AEG) being greater than the amount of carboxylic acid end groups (CEG); and (ii) at least one high chain-length polyamide; (b) at least one reinforcing filler; (c) at least one heat stabilizer; (d) aluminum stearate; and optionally (e) at least one additive. The polyamide composition can be advantageously used to produce articles exhibiting enhanced chemical resistance, notably $CaCl_2$ salt crack resistance, such as radiator end tank in an automobile.

19 Claims, No Drawings

(56) References Cited

U.S. PATENT DOCUMENTS

2014/0378604 A1* 12/2014 Yu .......................... C08L 77/06
524/538
2015/0310962 A1* 10/2015 Touge ..................... H01B 3/44
428/392

OTHER PUBLICATIONS

Processing and Finishing of Polymeric Materials vol. 1: Additives: Coupling Agents, Wiley, Hoboken, New Jersey, 2011, pp. 4-5.*
First Office Action dated Mar. 1, 2019, issued in corresponding Chinese Patent Application No. 201580068048.9, with Global Dossier English translation (11 pages).
Notice of Reasons for Refusal (Office Action) dated Oct. 29, 2019, issued in corresponding Japanese Patent No. JP 2017-531314, with USPTO Global Dossier English translation (16 pages).

* cited by examiner

POLYAMIDE COMPOSITIONS COMPRISING A BLEND OF POLYAMIDE 6,6 AND AT LEAST ONE HIGH CHAIN-LENGTH POLYAMIDE, AND Al STEARATE, USE THEREOF, AND ARTICLES OBTAINED THEREFROM

CROSS-REFERENCE TO RELATED APPLICATIONS

The present application is a U.S. national phase entry under 35 U.S.C. § 371 of International Application No. PCT/EP2015/078335, filed Dec. 2, 2015, which claims priority to European application No. 14197675.3 filed on Dec. 12, 2014, the whole content of this application being incorporated herein by reference. Should the disclosure of any patents, patent applications, and publications which are incorporated herein by reference conflict with the description of the present application to the extent that it may render a term unclear, the present description shall take precedence.

TECHNICAL FIELD

The present invention relates to a polyamide composition comprising (a) at least one polyamide mixture formed from (i) at least one polyamide 6,6, the amount of amine end group (AEG) being greater than the amount of carboxylic acid end group (CEG); and (ii) at least one high chain-length polyamide; (b) at least one reinforcing filler; (c) at least one heat stabilizer; (d) aluminum (Al) stearate; and optionally (e) at least one additive. The polyamide composition of the present invention can be advantageously used to produce articles exhibiting enhanced chemical resistance, notably with respect to $CaCl_2$, $ZnCl_2$, and ethylene glycol, such as radiator end tank in an automobile.

BACKGROUND OF THE INVENTION

The following discussion of the prior art is provided to place the invention in an appropriate technical context and enable the advantages of it to be more fully understood. It should be appreciated, however, that any discussion of the prior art throughout the specification should not be considered as an express or implied admission that such prior art is widely known or forms part of common general knowledge in the field.

A polyamide is one of the polymers which are frequently used as engineering plastics for a very wide range of applications. A polyamide molding composition is of significant commercial interest and may be used to produce automobile or electrical components, generally by injection molding, in view of weight reduction, ease in assembling parts/components and also its design flexibility.

For particular applications, such as automobile engine components including radiator end tank, air intake manifold, water pump body, intercooler air duct, timing belt cover, electrical connector and engine cover, which are to be exposed to high temperature during their lifecycle, required is a polyamide molding composition which is capable of exhibiting excellent mechanical strength and thermal stability, i.e., high performance retention of mechanical properties such as tensile strength (TS) to break and Charpy impact strength after thermal aging, good spiral flow, and minimum distortion during injection molding as well as low moisture content and excellent salt crack resistance.

In general, a polyamide molding composition comprising reinforcing fillers exhibits excellent mechanical properties such as impact strength, flexural properties, and excellent toughness in addition to good heat resistance, and thus can be substituted for metal materials, which have been used as structural materials for automobiles. Normally, those structural materials are used in chemically aggressive environments, e.g., antifreeze at elevated temperatures and deicing agent commonly used on the roads during winter time.

Polyamide 6,6 is frequently used when high mechanical strength and good stability under heat is required, but polyamide 6,6 is also susceptible to hydrolysis, and exhibits relatively low resistance to chlorides, e.g., sodium chloride, calcium chloride, and zinc chloride, which are particularly useful to prevent ice formation and to device the surface of roads by depressing the freezing point of water, and also exhibits low resistance to ethylene glycol and propylene glycol, which are commonly used as antifreeze in an engine cooling system.

Further, ionic lubricants, such as metal soaps, e.g., Al salts, Zn salts, alkali metal salts, alkaline earth metal salts, or esters or amides of fatty acids, in particular the soaps of alkaline earth metals are widely used to stabilize plastics, functioning as release agents in polyamides and polyesters, as stabilizers in PVC, and also as acid acceptors in polyolefins. Metal soaps are commonly incorporated into a polyamide composition as lubricant to prevent a polyamide molding composition from adhering to the surface of a mold, and also used as nucleating agents in polyamides. However, the presence of ionic lubricants within a polyamide composition reinforced with fillers such as glass fibers is normally detrimental to the impact strength of the polyamide composition, since ionic lubricants tend to hinder the binding of glass fibers to polyamides.

It is hence required a polyamide 6,6 composition, which comprises at least one reinforcing filler and at least one ionic lubricant, exhibiting better resistance to chemicals, while maintaining advantageous mechanical and thermal properties thereof. For instance, PCT publication No. WO 2013/041594 A1 (Rhodia Operations) discloses a blend of a polyamide 6,6, of which the amount of amine end group (AEG) is greater than the amount of carboxylic acid end group (CEG), with a polyamide selected from the group consisting of polyamide 6,10, polyamide 10,10 and polyamide 10,12, which may remedy the drawbacks of a polyamide 6,6 composition as above mentioned, but no mention is made regarding the selection of lubricants, the presence of an ionic lubricant and also its effect on the chemical resistance of a polyamide composition.

Therefore, a polyamide 6,6 composition, which comprises at least one reinforcing filler and at least one ionic lubricant, exhibiting better resistance to chemicals in addition to other desirable properties as above mentioned, is required in this technology field.

DESCRIPTION OF THE INVENTION

The object of the present invention is therefore to provide a polyamide 6,6 composition, which enables obtaining better resistance to chemicals while maintaining other advantageous mechanical parameters and also thermal properties, even in the presence of an ionic lubricant.

The present invention relates to a polyamide composition comprising:
(a) from 33.0 to 98.9% by weight (wt %) of at least one polyamide mixture formed from
  (i) from 13.0 to 38.9 wt % of at least one polyamide 6,6 having amine end groups (AEG) and optionally carboxylic acid end groups (CEG), wherein the amount of AEG is greater than the amount of CEG;
(ii) from 20.0 to 60.0 wt % of at least one high chain-length polyamide;
(b) from 1.0 to 60.0 wt % of at least one reinforcing filler;
(c) from 0.05 to 3.0 wt % of at least one heat stabilizer;
(d) from 0.05 to 1.0 wt % of Al stearate; and
(e) from 0 to 3.0 wt % of at least one additive,
wherein each amount of (a), (i), (ii), (b), (c), (d), and (e) is with respect to the total weight of the polyamide composition and the sum of wt % of (a) to (e) adds to 100 wt %

One of the essential features of the present invention resides in an addition of Al stearate as lubricant. Indeed, it has been surprisingly found by the present inventors that use of Al stearate makes it possible to obtain satisfactory $CaCl_2$ salt crack resistance of a polyamide composition, compared to polyamide compositions comprising metal salts other than Al stearate, e.g., Ca stearate, Mg stearate and Zn stearate, without deteriorating other mechanical and thermal properties.

Other characteristics, details and advantages of the present invention will emerge even more fully upon reading the description which follows.

Throughout the description, including the claims, the term "comprising one" should be understood as being synonymous with the term "comprising at least one", unless specified otherwise, and "between" should be understood as being inclusive of the limits.

In the present invention, a "polyamide 6,6" is intended to denote, in particular, a polyamide comprising recurring units, at least 90% moles, preferably at least 95% moles of recurring units complying with the formula of $-NH-(CH_2)_6-NH-CO-(CH_2)_4-CO-$, which can be notably obtained via polycondensation reaction of hexamethylene diamine and adipic acid.

Preferably, a polyamide 6,6 consists essentially of said recurring units, being understood that end-chain, defects and other irregularities can be present in the polyamide chain, without affecting the properties thereof.

Recurring units of polyamide 6,6 can be all of the same type, or can be of more than one type, that is to say that polyamide 6,6 can be a homo-polyamide or a co-polyamide.

Polyamide 6,6 may also comprise less than 10% moles, preferably less than 5% moles of additional recurring units other than $-NH-(CH_2)_6-NH-CO-(CH_2)_4-CO-$. Notably, polyamide 6,6 may comprise additional recurring units ($R_{PAL}$ or $R_{PAS}$) of the polyamide as detailed below.

As said, the said polyamide 6,6 has amine end groups (AEG) and optionally carboxylic acid end groups (CEG); while the amount of carboxylic acid groups might be below detection limits of analytical technique used, and hence equated to a "zero" amount of CEG, it is generally acknowledged that the said polyamide 6,6 comprises measurable amounts of both AEG and CEG.

In the present invention, the term "high chain-length polyamide" is intended to denote, in particular, a polyamide comprising recurring units, at least 50% moles of said recurring units complying with any of formula (I) or formula (II) [recurring units ($R_{PAL}$)]:

formula (I):

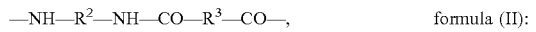

formula (II):

wherein
R¹, equal to or different from each other at each occurrence, is a divalent hydrocarbon group having from 6 to 17 carbon atoms and wherein R² and R³, equal to or different from each other at each occurrence, are divalent hydrocarbon groups, with the proviso that at least one of following conditions is satisfied:
R² has from 7 to 18 carbon atoms; and
R³ has from 5 to 16 carbon atoms.

The high chain-length polyamide of the inventive composition is preferably an aliphatic polyamide, that is to say that R¹, R² and R³ are aliphatic groups.

Recurring units ($R_{PAL}$) of the high chain-length polyamide can be notably obtained through (1) polycondensation reaction of one of 9-aminononanoic acid, 10-aminodecanoic acid, 11-aminoundecanoic acid, 12-aminododecanoic acid and/or (2) polycondensation reaction of one of pimelic acid [HOOC—(CH₂)₅—COOH], suberic acid [HOOC—(CH₂)₆—COOH], azelaic acid [HOOC—(CH₂)₇—COOH], sebacic acid [HOOC—(CH₂)₈—COOH], undecanedioic acid [HOOC—(CH₂)₉—COOH], dodecandioic acid [HOOC—(CH₂)₁₀—COOH], tetradecandioic acid [HOOC—(CH₂)₁₂—COOH], octadecandioic acid [HOOC—(CH₂)₁₆—COOH] with one of 1,6-diaminohexane, 1,7-diaminoheptane, 1,8-diamino-octane, 1,6-diamino-2,5-dimethylhexane, 1,6-diamino-2,4-dimethylhexane, 1,6-diamino-3,3-dimethylhexane, 1,6-diamino-2,2-dimethylhexane, 1,9-diaminononane, 1,6-diamino-2,2,4-trimethylhexane, 1,6-diamino-2,4,4-trimethylhexane, 1,7-diamino-2,3-dimethylheptane, 1,7-diamino-2,4-dimethylheptane, 1,7-diamino-2,5-dimethylheptane, 1,7-diamino-2,2-dimethylheptane, 1,10-diaminodecane, 1,8-diamino-1,3-dimethyloctane, 1,8-diamino-1,4-dimethyloctane, 1,8-diamino-2,4-dimethyloctane, 1,8-diamino-3,4-dimethyloctane, 1,8-diamino-4,5-dimethyloctane, 1,8-diamino-2,2-dimethyloctane, 1,8-diamino-3,3-dimethyloctane, 1,8-diamino-4,4-dimethyloctane, 1,6-diamino-2,4-diethylhexane, 1,9-diamino-5-methylnonane, 1,11-diaminoundecane, and 1,12-diaminododecane.

Exemplary recurring units ($R_{PAL}$) of the high chain-length polyamide are notably:
(i) $-NH-(CH_2)_8-CO-$, i.e. recurring units which can be notably obtained via polycondensation reaction of 9-aminononanoic acid;
(ii) $-NH-(CH_2)_9-CO-$, i.e. recurring units which can be notably obtained via polycondensation reaction of 10-aminodecanoic acid;
(iii) $-NH-(CH_2)_{10}-CO-$, i.e. recurring units which can be notably obtained via polycondensation reaction of 11-aminoundecanoic acid;
(iv) $-NH-(CH_2)_{11}-CO-$, i.e. recurring units which can be notably obtained via polycondensation reaction of laurolactam;
(v) $-NH-(CH_2)_6-NH-CO-(CH_2)_8-CO-$, i.e. recurring units which can be notably obtained via polycondensation reaction of hexamethylene diamine and sebacic acid;
(vi) $-NH-(CH_2)_6-NH-CO-(CH_2)_{10}-CO-$, i.e. recurring units which can be notably obtained via polycondensation reaction of hexamethylene diamine and dodecandioic acid;
(vii) $-NH-(CH_2)_{10}-NH-CO-(CH_2)_{10}-CO-$, i.e. recurring units which can be notably obtained via polycondensation reaction of decamethylene diamine and dodecandioic acid;
(viii) $-NH-(CH_2)_6-NH-CO-(CH_2)_7-CO-$, i.e. recurring units which can be notably obtained via polycondensation reaction of hexamethylene diamine and azelaic acid (otherwise known as nonandioic acid);

(ix) —NH—(CH$_2$)$_{12}$—NH—CO—(CH$_2$)$_{10}$—CO—, i.e. recurring units which can be notably obtained via polycondensation reaction of dodecamethylene diamine and dodecandioic acid;

(x) —NH—(CH$_2$)$_{10}$—NH—CO—(CH$_2$)$_8$—CO—, i.e. recurring units which can be notably obtained via polycondensation reaction of decamethylene diamine and decandioic acid; and (xi) —NH—(CH$_2$)$_6$—NH—CO—(CH$_2$)$_{16}$—CO—, i.e. recurring units which can be notably obtained via polycondensation reaction of hexamethylene diamine and octadecandioic acid.

The high chain-length polyamide may comprise recurring units different from recurring units (R$_{PAL}$), as defined above. Notably, the high chain-length polyamide may comprise recurring units (R$_{PAS}$) of shorter length, generally complying with any of formulae (III) and (IV):

$$-NH-R^4-CO-; \quad \text{formula (III):}$$

$$-NH-R^5-NH-CO-R^6-CO-, \quad \text{formula (IV):}$$

wherein:
R$^4$, equal to or different from each other at each occurrence, is a divalent hydrocarbon group having 5 carbon atoms or less;

and wherein R$^5$ and R$^6$, equal to or different from each other at each occurrence, are divalent hydrocarbon groups, with the proviso that at least one of following conditions is satisfied:
R$^5$ has less than 7 carbon atoms; and
R$^6$ has less than 5 carbon atoms.

Recurring units (R$_{PAS}$) of the polyamide can be notably obtained through (1) polycondensation reaction of one of β-lactam, 5-amino-pentanoic acid, and ε-caprolactam, and/or (2) polycondensation reaction of at least one of 1,2-diaminoethane, 1,2-diaminopropane, propylene-1,3-diamine, 1,3-diaminobutane, 1,4-diaminobutane, 1,5-diaminopentane, 1,4-diamino-1,1-dimethylbutane, 1,4-diamino-1-ethylbutane, 1,4-diamino-1,2-dimethylbutane, 1,4-diamino-1,3-dimethylbutane, 1,4-diamino-1,4-dimethylbutane, 1,4-diamino-2,3-dimethylbutane, 1,2-diamino-1-butylethane, and 1,6-diaminohexane with a diacid and/or (3) polycondensation reaction of at least one diamine with at least one of oxalic acid (HOOC—COOH), malonic acid (HOOC—CH$_2$—COOH), succinic acid [HOOC—(CH$_2$)$_2$—COOH], glutaric acid [HOOC—(CH$_2$)$_3$—COOH], and adipic acid [HOOC—(CH$_2$)$_4$—COOH].

Non limitative examples of recurring units (R$_{PAS}$) of the polyamide are notably:
(i) —NH—(CH$_2$)$_5$—CO—, i.e. recurring units which can be notably obtained via polycondensation reaction of ε-caprolactam; and
(ii) —NH—(CH$_2$)$_4$—NH—CO—(CH$_2$)$_4$—CO—, i.e. recurring units which can be notably obtained via polycondensation reaction of 1,4-butanediamine and adipic acid.

Preferably, the high chain-length polyamide consists essentially of recurring units (R$_{PAL}$), as above detailed, being understood that end-chain, defects and other irregularities can be present in the polyamide chain, without this affecting the properties thereof.

Recurring units (R$_{PAL}$) of the polyamide can be all of the same type, or can be of more than one type, that is to say that the polyamide can be a homo-polyamide or a co-polyamide.

Specific examples of the high chain-length polyamides (PA) which can be advantageously used in the hereby provided composition are notably:

polyamide 11 (consisting essentially of recurring units of type (iii) as above detailed);
polyamide 12 (consisting essentially of recurring units of type (iv) as above detailed);
polyamide 12,12 (consisting essentially of recurring units of type (ix) as above detailed);
polyamide 6,12 (consisting essentially of recurring units of type (vi) as above detailed);
polyamide 6,10 (consisting essentially of recurring units of type (v) as above detailed);
polyamide 6,18 (consisting essentially of recurring units of type (xi) as above detailed)
polyamide 10,10 (consisting essentially of recurring units of type (x) as above detailed);
polyamide 10,12 (consisting essentially of recurring units of type (vii) as above detailed);
and mixtures thereof.

Particularly, polyamide 11, polyamide 12, polyamide 6,10, polyamide 6,12, polyamide 6,18, polyamide 10,10, polyamide 10,12, polyamide 12,12, or any mixtures thereof can be used in the present invention. Polyamide 6,10 can be most preferably used in the polyamide composition according to the present invention.

Particularly preferred polyamide mixture to be used in the composition of the present invention is formed from (i) at least one polyamide 6,6, of which the amount of AEG is greater than the amount of CEG; and (ii) at least one high chain-length polyamide, the weight ratio of (i) a polyamide 6,6 to (ii) at least one high chain-length polyamide comprised between about 5:5 and about 3:7, preferably about 4:6.

When equimolar amounts of end groups are present, increasing the amount of both end groups improves stability, whereas when an excess of AEG is present, exposure to oxidation conditions results in a decrease of the amount of AEG and slower degradation, and when an excess of CEG is present, exposure to oxidation conditions results in an increase of the amount of CEG and rapid degradation. That is to say, when prepared using a stoichiometric balance of diamine and dicarboxylic acid, absent side reactions occurring during the polymerization, the resulting resin will have a substantial balance of AEG and CEG. Where an excess of one of the monomers is employed, however, one end group will predominate. For example, polymerizing a diamine-rich monomer mixture will result in a polymer with a greater amount of AEG.

The methods to determine end group concentration of a polyamide are described comprehensively in the literature, particularly in Nylon Plastics Handbook by Melvin. I. Kohan (Hanser, 1995, 79-80 p).

The amount of acid end groups are typically determined by a method, wherein a 2-4% solution in benzyl alcohol is titrated with 0.01 to 0.1 N KOH in benzyl alcohol or ethylene glycol at a temperature between 50 and 185° C. The amount of amine end groups are determined by titrating a 2% nylon solution in a phenol/methanol/water mixture (50:25:25 by volume) with 0.1 N hydrochloric acid. The end point is determined visually with phenolphthalein, potentiometrically, or conductometrically. A parallel blank with no polymer must be run to account for the conversion of benzyl alcohol to benzoic acid for the determination of acid end groups and blank corrections must be made as well for the determination of amine end groups. Trifluoroethanol ("TFE") can be used as solvent in case of polyamide 6 or polyamide 6,6.

Examples of the method to determine the amounts of AEG and CEG of polyamide 6,6 include a method wherein a predetermined amount of sample is dissolved in a mixture of TFE and chloroform. The amounts of AEG and CEG are determined by a back titration.

In a particular embodiment of the present invention, the amount of AEG of polyamide 6,6 is preferably greater than or equal to 50 meq/kg, more preferably greater than or equal to 70 meq/kg. The difference between the amounts of AEG and CEG in (i) the polyamide 6,6 is preferably greater than or equal to 5 meq/kg, more preferably greater than 10 meq/kg, in particular greater than or equal to 40 meq/kg.

In a particular embodiment of the present invention, an amount of (a) at least one polyamide mixture is preferably 33.0 to 98.9% by weight (wt %), more preferably 50.0 to 70.0 wt % relative to the total weight of the polyamide composition.

In a certain embodiment of the present invention, an amount of (i) a polyamide 6,6, of which the amount of AEG is greater than the amount of CEG, is preferably 13.0 to 38.9 wt %, more preferably 20.0 to 30.0 wt % relative to the total weight of the polyamide composition, and the amount of (ii) at least one high chain-length polyamide is preferably 20.0 to 60.0 wt %, more preferably 30.0 to 40.0 wt % relative to the total weight of the polyamide composition.

In the present invention, the term "reinforcing filler" is intended to denote, in particular, a material added to a polymer composition to improve its properties, such as rigidity, tensile strength, impact resistance and dimensional stability, and/or to reduce the cost. By appropriately selecting these materials, not only the economics but also other properties such as processing and mechanical behavior can be improved. Although these fillers retain their inherent characteristics, very significant differences are often observed depending on the molecular weight, compounding technique and the presence of other additives in the formulation. Therefore, once the basic property requirements are established, the optimum type and the loading level of the filler for the balance between cost and performance must be determined.

In the present invention, (b) at least one reinforcing filler is preferably selected from the group consisting of glass fibers, glass beads, calcium carbonate, silicates, talc, kaolin, mica, wood powders, and powders and fibers of other natural products, and synthetic fibers. Glass fibers are most advantageously used in the polyamide composition of the present invention.

In a particular embodiment of the present invention, an amount of (b) at least one reinforcing filler is from 1.0 to 60.0 wt %, preferably from 29.3 to 46.0 wt % with respect to the total weight of the composition.

In the present invention, the term "heat stabilizer" is intended to denote, in particular, a material added to a polymer composition to improve thermal stability by preventing thermo-oxidative degradation during processing.

In the present invention, (c) at least one heat stabilizer is preferably selected from the group consisting of hindered phenol compounds, hindered amine compounds, phosphorous compounds, copper-containing compounds, and combinations thereof, preferably a combination of a hindered phenol compound and a phosphorous compound, more preferably copper-containing compounds.

The term "hindered phenol compound" is used according to its customary meaning in this field and generally intended to denote derivatives of ortho-substituted phenol, especially (but not limited to) di-tert-butyl-phenol derivatives, well known in the art.

Examples of hindered phenol compounds are listed in Table A below:

TABLE A

| | Formula |
|---|---|
| (a1) tetrakis(3-(3,5-di-tert-butyl-4-hydroxyphenyl)propionate), commercially available, notably as Irganox ® 1010 stabilizer from BASF | 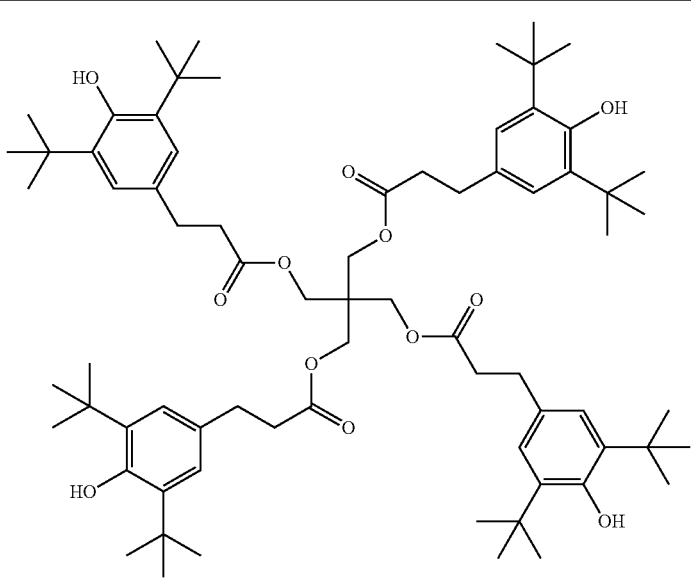 |

TABLE A-continued

| Formula |
|---|
| (a2) thiodiethylene bis[3-(3,5-di-tert-butyl-4-hydroxyphenyl)propionate], commercially available, notably as Irganox ® 1035 stabilizer from BASF |
| (a3) octadecyl-3-(3,5-di-tert-butyl-4-hydroxyphenyl)-propionate, commercially available, notably as Irganox ® 1076 stabilizer from BASF |
| (a4) N,N'-hexane-1,6-diyl-bis(3-(3,5-di-tert-butyl-4-hydroxyphenylpropionamide)), commercially available, notably as Irganox ® 1098 stabilizer from BASF |
| (a5) 1,3,5-trimethyl-2,4,6-tris(3,5-di-tert-butyl-4-hydroxybenzyl)benzene, commercially available, notably as Irganox ® 1330 stabilizer from BASF |
| (a6) benzenepropanoic acid, 3,5-bis(1,1-dimethylethyl)-4-hydroxy-C7-C9 branched alkyl esters, commercially available, notably as Irganox ® 1135 stabilizer from BASF |

TABLE A-continued

| Formula |
|---|
| (a7) hexamethylene bis[3-(3,5-di-tert-butyl-4-hydroxyphenyl)propionate], commercially available, notably as Irganox ® 259 stabilizer from BASF 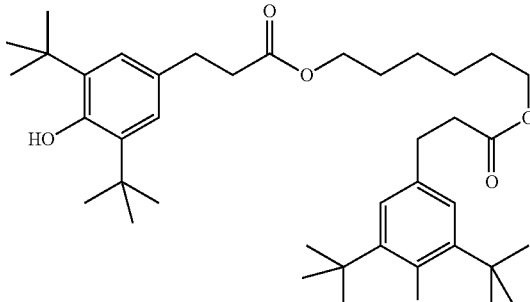 |
| (a8) tris(3,5-di-tert-butyl-4-hydroxybenzyl) isocyanurate, commercially available, notably as Irganox ® 3114 stabilizer from BASF 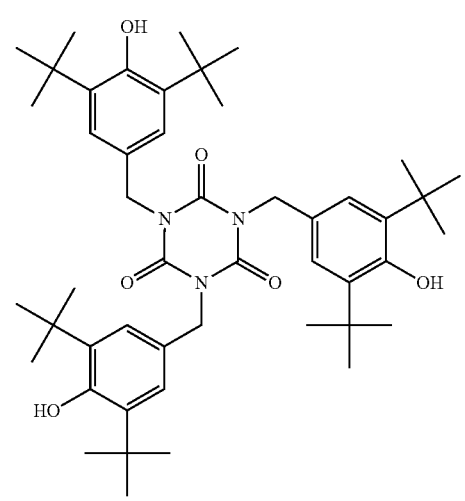 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O] |
| (a9) 2,6-di-tert-butyl-4-(4,6-bis(octylthio)-1,3,5-triazin-2-ylamino)phenol, commercially available, notably as Irganox ® 565 stabilizer from BASF 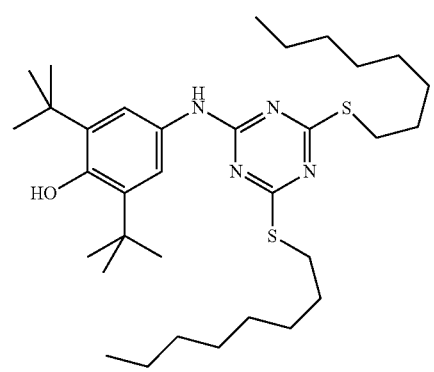 [SMILES: CCCCCCCCSc1nc(Nc2cc(C(C)(C)C)c(O)c(C(C)(C)C)c2)nc(SCCCCCCCC)n1] |
| (a10) commercially available, notably as Irganox ® 1425 stabilizer from BASF 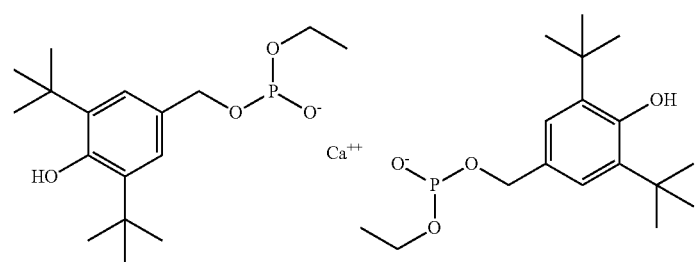 [SMILES: CCOP([O-])OCc1cc(C(C)(C)C)c(O)c(C(C)(C)C)c1 ; [Ca+2] ; CCOP([O-])OCc1cc(C(C)(C)C)c(O)c(C(C)(C)C)c1] |

TABLE A-continued

| Formula |
|---|
| (a11) 2-methyl-4,6-bis(octylsulfanylmethyl)phenol, commercially available, notably as Irganox ® 1520 stabilizer from BASF 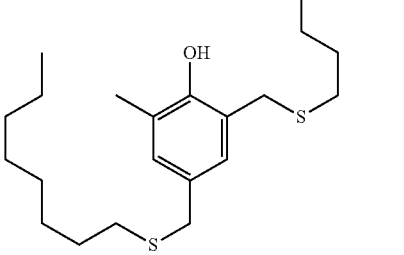 |
| (a12) 2,4-bis(dodecylthiomethyl)-6-methylphenol, commercially available, notably as Irganox ® 1726 stabilizer from from BASF 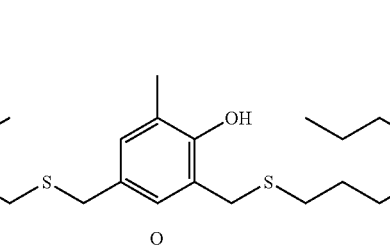 |
| (a13) triethylene glycol bis(3-tert-butyl-4-hydroxy-5-methylphenyl)propionate, commercially available, notably as Irganox ® 245 stabilizer from BASF 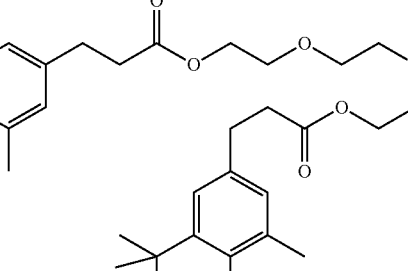 |

The term "hindered amine compound" is used according to its customary meaning in this field and generally intended to denote derivatives of 2,2,6,6-tetramethyl piperidine well known in the art (see for example: *Plastics Additives Handbook, 5$^{th}$ ed.*, Hanser, 2001). The hindered amine compound of the composition according to the present invention may either be of low or high molecular weight.

The hindered amine compounds of low molecular weight have typically a molecular weight of at most 900, preferably at most 800, more preferably of at most 700, still more preferably at most 600, and most preferably of at most 500 g/mol.

Examples of low molecular weight hindered amine compounds are listed in Table B below:

TABLE B

| Formula |
|---|
| (b1) 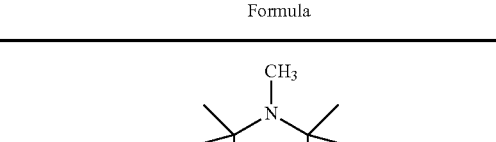 |

TABLE B-continued
| Formula | |
|---|---|
|  | (b2) |
| 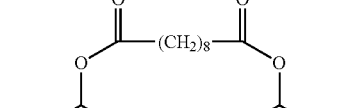 | (b3) |
| 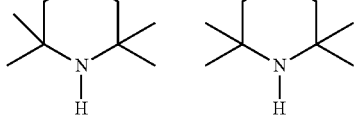 | (b4) |
| 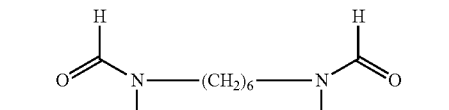 | (b5) |
| 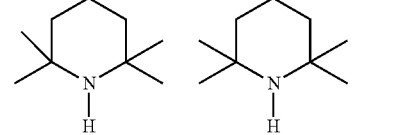 | (b6) |

TABLE B-continued
| Formula |
|---|
| 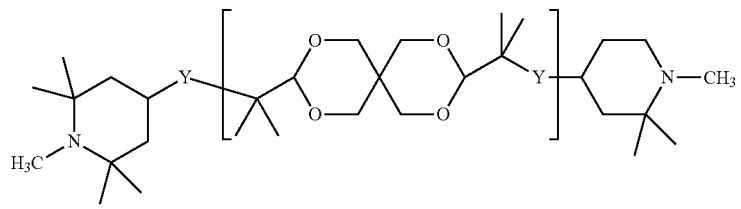 (b7) |
| 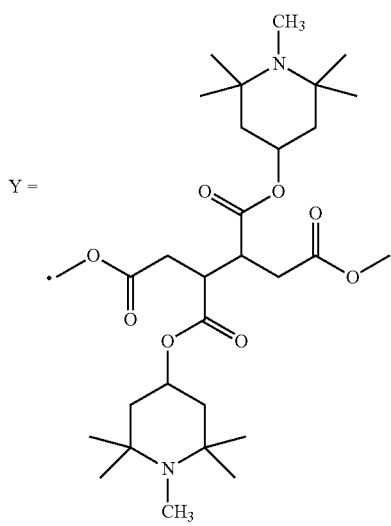 |
| 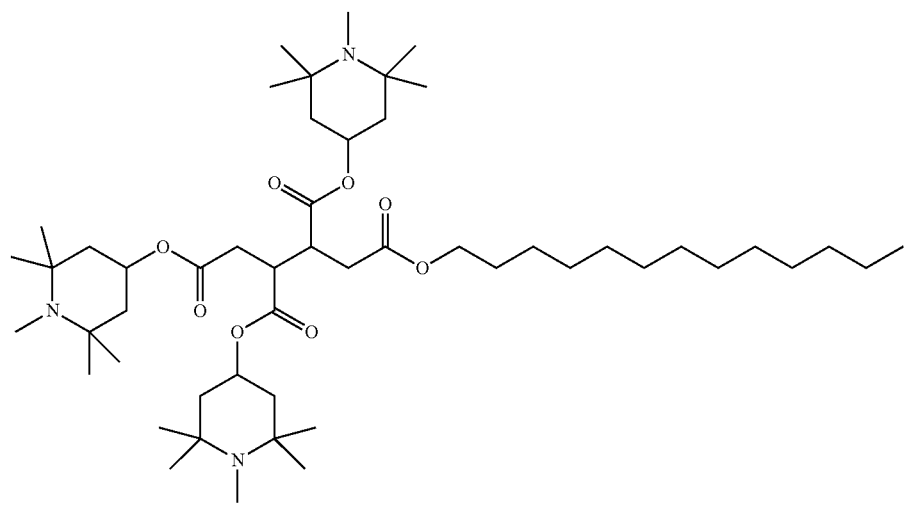 [SMILES: CCCCCCCCCCCCCOC(=O)CC(C(=O)OC1CC(C)(C)N(C)C(C)(C)C1)C(CC(=O)OC1CC(C)(C)N(C)C(C)(C)C1)C(=O)OC1CC(C)(C)N(C)C(C)(C)C1] (b8) |

TABLE B-continued

Formula

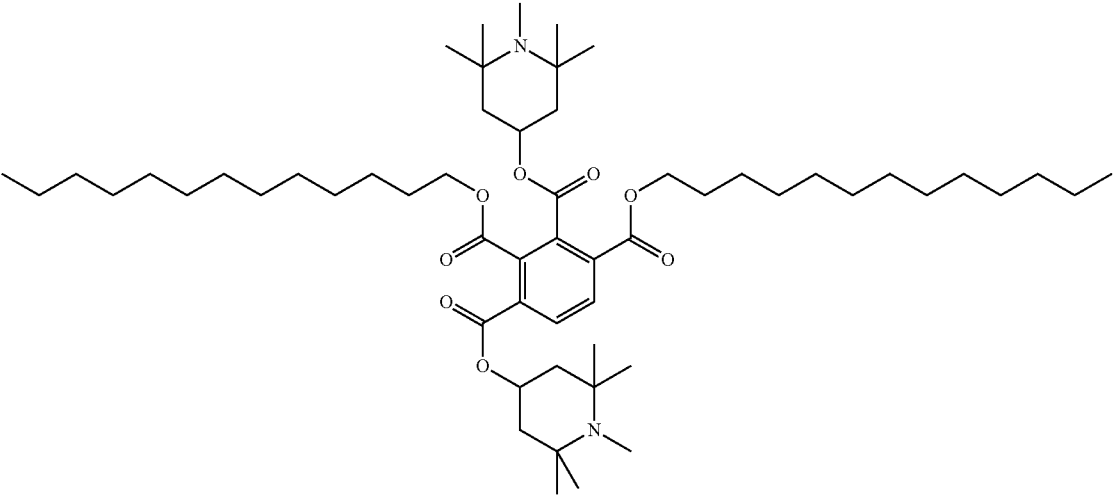 [SMILES: CCCCCCCCCCCCCOC(=O)c1ccc(C(=O)OC2CC(C)(C)N(C)C(C)(C)C2)c(C(=O)OCCCCCCCCCCCCC)c1C(=O)OC1CC(C)(C)N(C)C(C)(C)C1]

(b9)

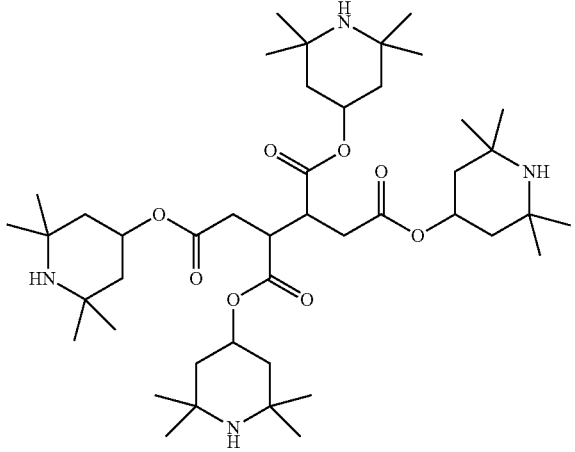

(b10)

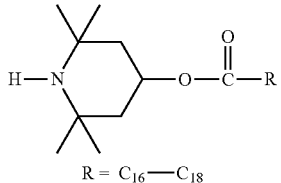

(b11)

R = C$_{16}$—C$_{18}$

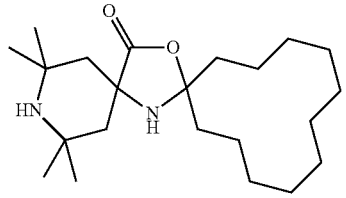 [SMILES: CC1(C)CC2(CC(C)(C)N1)NC1(CCCCCCCCCCC1)OC2=O]

(b12)

The hindered amine compounds of high molecular weight are typically polymeric and have typically a molecular weight of at least 1000, preferably at least 1100, more preferably of at least 1200, still more preferably at least 1300, and most preferably of at least 1400 g/mol.

Examples of high molecular weight hindered amine compounds are listed in Table C below:

TABLE C

Formula (c1), (c2), (c3), (c4), (c5)

TABLE C-continued

Formula

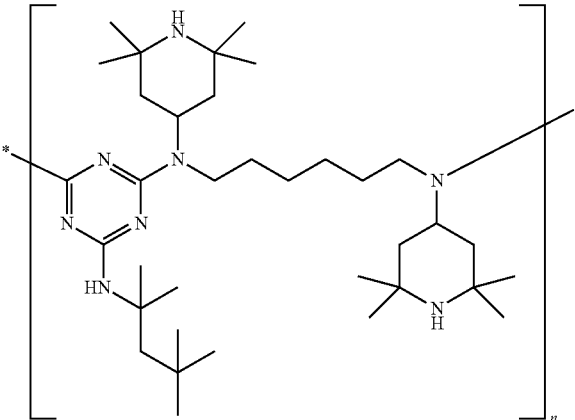

(c6)

The "n" in the formulas (c1) to (c6) of Table C indicates the number of repeating units in the polymer and is usually an integral equal or greater than 4.

In the present invention, (c) at least one heat stabilizer may be at least one phosphorous compound selected from the group consisting of an alkali or alkali earth metal hypophosphites, phosphite esters, phosphonites and mixtures thereof.

Sodium and calcium hypophosphites are preferred alkali or alkali earth metal hypophosphites.

A phosphite ester may be represented by the formula $P(OR)_3$, while a phosphonite may be represented by the formula $P(OR)_2R$, wherein each of R, can be the same or different and are typically independently selected from the group consisting of a $C_{1-20}$ alkyl, $C_{3-22}$ alkenyl, $C_{6-40}$ cycloalkyl, $C_{7-40}$ cycloalkylene, aryl, alkaryl or arylalkyl moiety.

Examples of phosphite esters are listed in the Table D below:

TABLE D

Formula

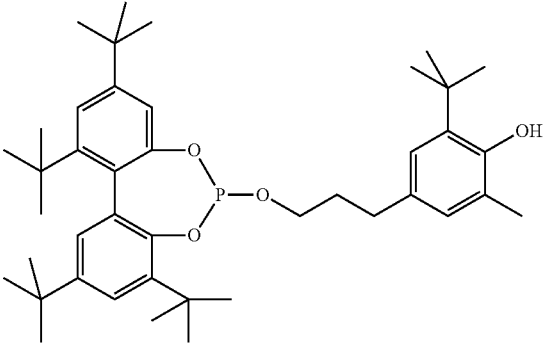 [SMILES: Cc1cc(CCCOp2oc3cc(C(C)(C)C)cc(C(C)(C)C)c3c3cc(C(C)(C)C)cc(C(C)(C)C)c3o2)cc(C(C)(C)C)c1O]

(d1)

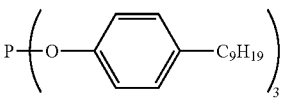

(d2)

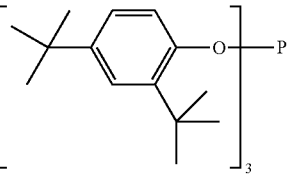

(d3)

TABLE D-continued
Formula
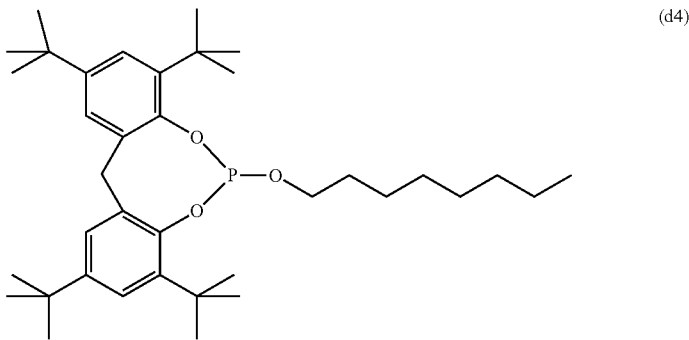
(d4)
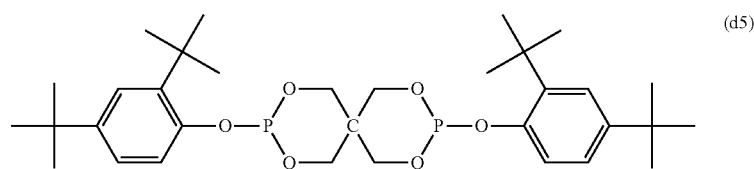
(d5)
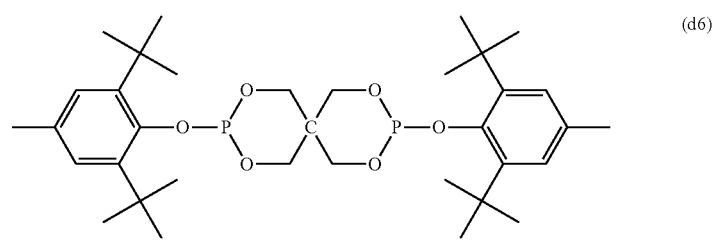
(d6)
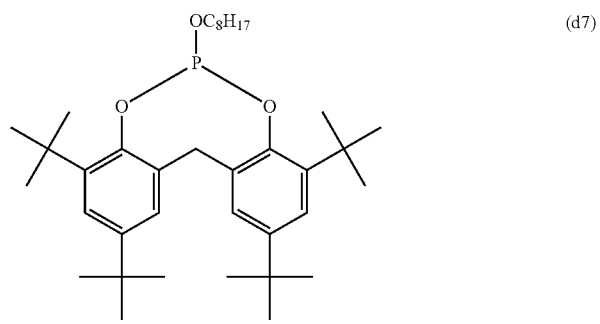
(d7)
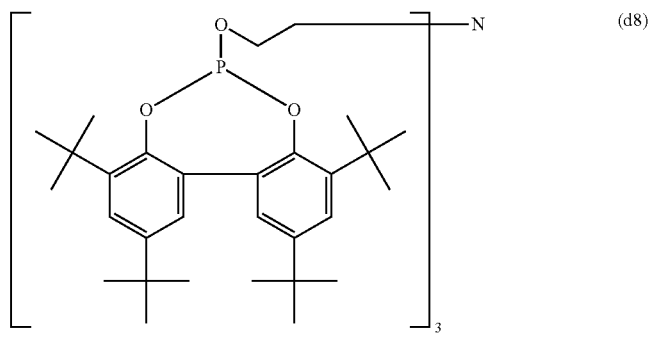
(d8)
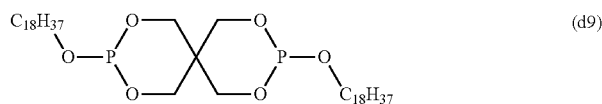
(d9)

TABLE D-continued

| Formula | |
|---|---|
| (chemical structure) | (d10) |
| (chemical structure) | (d11) |
| (chemical structure) | (d12) |

Examples of phosphonites are listed in the Table E below:

TABLE E

| Formula | |
|---|---|
| (chemical structure) | (e1) |

TABLE E-continued

Formula (e2)

[Chemical structure: phosphite compound with two di-tert-butyl phenoxy groups connected through a methylene bridge and bonded to phosphorus with fluorine]

The copper-containing stabilizer, which can be used for a polyamide composition according to the present invention, is further characterized as comprising a copper compound soluble in the polyamide and an alkali metal halide. More particularly, the copper-containing stabilizer consists essentially of a copper compound selected from the group consisting of copper (I) oxide, copper (II) oxide, copper (I) salt, for example cuprous acetate, cuprous stearate, a cuprous organic complex compound such as copper acetylacetonate, a cuprous halide or the like; and an alkali metal halide. According to certain preferred embodiments, the copper-containing stabilizer will consist essentially of a copper halide selected from copper iodide and copper bromide and an alkali metal halide selected from the group consisting of iodides and bromides of Li, Na, and K. Stabilizing formulations comprising copper (I) iodide and potassium iodide are well known and commercially available for use in stabilizing polyamides, preferably aliphatic polyamides including polyamide 6, polyamide 6,6, polyamide 6,10, and the like.

In a particular embodiment of the present invention, a hindered amine light stabilizer (HALS) can be used in combination with a hindered phenol compound and a hindered amine compound.

A preferred combination is the combination of a hindered phenol compound and a phosphorous compound.

A particularly preferred combination is the combination of CuI and KI. Another very advantageous combination is the mixture of $Cu_2O$ and KBr.

In the present invention, the weight ratio of copper (I) halide to alkali metal halide is in the range of from about 1:2.5 to about 1:20, preferably from about 1:3 to about 1:10, more preferably about 1:5.

In a particular embodiment of the present invention, an amount of (c) at least one heat stabilizer is from 0.05 to 3.0 wt %, preferably from 0.1 to 2.0 wt % with respect to the total weight of the composition.

In the present invention, the term "ionic lubricant" is intended to denote, in particular, an ionic material added to a polymer composition to facilitate the flow of the melt by reducing internal friction and to prevent a polyamide molding composition from adhering to the surface of a mold.

In the present invention, an amount of (d) Al stearate is from 0.05 to 1.0 wt %, preferably from 0.1 to 0.5 wt % with respect to the total weight of the composition.

While not being bound by any particular theory, it is believed that use of Al stearate as lubricant in a polyamide composition endows superior salt crack resistance and corrosion resistance to a polyamide composition, which is required to the automobile engine components including radiator end tank, air intake manifold, water pump body, intercooler air duct, timing belt cover, electrical connector and engine cover, which are to be exposed to high temperature and chemicals during their lifecycle, while attaining excellent mechanical and thermal properties. It is also believed that such result is partly due to the difference of ionization tendency of metals. For instance, Ca and Mg have higher ionization tendency than Al, which has similar ionization tendency with Zn. Therefore, Ca stearate and Mg stearate would be unfavorable in view of corrosion resistance in comparison with Al stearate and Zn stearate.

Further, the polyamide composition of the present invention may optionally comprise (e) at least one additive usually used in the polyamide-based compositions in addition to the above components (a)-(d). In particular, the polyamide composition according to the present invention may further comprise one or more additives selected from the group consisting of a colorant, a UV stabilizer, a flame retardant, a plasticizer, an impact modifier, a coupling agent, a crosslinking agent, a nucleating agent, a surfactant, an antistatic agent, a dye, a pigment, and any combinations thereof. In a particular embodiment of the present invention, the polyamide composition according to the present invention comprises at least one chain extender and at least one dye.

In the present invention, an amount of additive(s) may be from 0 to 3.0 wt %, preferably from 0.1 to 2.0 wt %, and more preferably from 0.5 to 1.5 wt % with respect to the total weight of the polyamide composition.

In a preferred embodiment of the present invention, the polyamide composition preferably comprises:
(a) 50.0 to 70.0 wt % of at least one polyamide mixture formed from
 (i) from 20.0 to 30.0 wt % of a polyamide 6,6, the difference between the amounts of AEG and CEG being greater than or equal to 40 meq/kg; and
 (ii) from 30.0 to 40.0 wt % of a polyamide 6,10;
(b) 29.3 to 46.0 wt % of glass fibers in the chopped form with the weight average length of about 3 mm;
(c) 0.1 to 2.0 wt % of CuI/KI with the weight ratio of CuI:KI being about 1:5;
(d) 0.1 to 0.5 wt % of Al stearate; and
(e) 0.5 to 1.5 wt % of at least one additive,
wherein each amount of (a), (i), (ii), (b), (c), (d), and (e) is with respect to the total weight of the polyamide composition and the sum of wt % of (a) to (e) adds to 100 wt %.

The polyamide composition of the present invention can be obtained by mixing the various components generally in a single or twin screw extruder at a temperature sufficient to maintain the polyamide resin in the melt. Generally, the mixture is extruded into rods which are cut into pieces to form granules or pellets. Additives may be added together or separately by mixing polyamide hot or cold. Thusly-obtained granules or pellets can be further processed to powder form, for instance, by a grinding with liquid nitrogen.

The obtained polyamide composition can be used as raw material for manufacturing articles exhibiting enhanced chemical resistance, notably $CaCl_2$ salt crack resistance, in particular radiator end tank.

The polyamide composition according to the present invention shows good chemical resistance, notably with respect to $CaCl_2$, $ZnCl_2$, and ethylene glycol, while maintaining good mechanical properties, and therefore can be advantageously used for the articles intended for automobile or electrical components. The present invention also relates to articles or parts of articles comprising the polyamide composition according to the present invention.

The articles according to the invention are advantageously automobile engine components such as radiator end tank, air intake manifold, water pump body, intercooler air duct, timing belt cover, electrical connector, and engine cover in an automobile, which are to be exposed to high temperature during their lifecycle. The polyamide composition according to the present invention, which is capable of exhibiting excellent heat resistance, i.e., high performance retention of mechanical properties such as tensile strength (TS) to break and Charpy impact strength after thermal aging, good spiral flow, and minimum distortion during injection molding as well as low moisture content and excellent salt crack resistance, is particularly well suited for the manufacture of the above mentioned articles.

Another aspect of the present invention is thus related to molded parts produced by injection molding of the present polyamide composition.

Another aspect of the present invention relates to use of the molded parts to produce engine components such as radiator end tank, air intake manifold, water pump body, intercooler air duct, timing belt cover, electrical connector, and engine cover in an automobile, preferably radiator end tank exhibiting enhanced chemical resistance, notably $CaCl_2$ salt crack resistance.

Further aspect of the present invention is related to use of Al stearate as lubricant to enhance salt crack resistance of a polyamide composition.

The articles according to the present invention are advantageously formed by injection molding. Various molding techniques may be used to form articles or parts of articles from the composition. Powders, pellets, beads, flakes, reground materials or other forms of the composition may be molded, with or without liquid or other additives, premixed or fed separately. Exact conditions may be determined by trial and error. Upper temperature limits may be estimated from thermal analysis such as thermogravimetric analysis (TGA). Lower temperature limits may be estimated from Tg as measured, for example, by dynamic mechanical thermal analysis (DMTA), differential scanning calorimetry (DSC), and the like. One skilled in the art will recognize the factors influencing injection moldability including the material's stress relaxation properties and the temperature dependence of melt viscosity.

While preferred embodiments of this invention have been shown and described, modifications thereof can be made by one skilled in the art without departing from the teaching of this invention. The embodiments and examples described herein are exemplary only and are not limiting. Many variations and modifications of systems and methods are possible and are within the scope of the invention. Accordingly, the scope of protection is not limited to the embodiments described herein, but is only limited by the claims that follow, the scope of which shall include all equivalents of the subject matter of the claims.

Further details and advantages of the invention will become apparent from the examples given below for illustrative purposes only.

EXAMPLES

Example 1: Preparation of Polyimide Composition 1 (Hereinafter, Ex.1)

Example 2 (Comparative): Preparation of Polyimide Compositions 2-5 (Hereinafter, Comp. Ex.1, Comp. Ex.2, Comp. Ex.3, and Comp. Ex.4)

The polyamide composition was prepared by mixing the components indicated in Table 1 below in a twin-screw extruder (internal diameter 30 mm; L/D=30) and subsequently extruding the mixture. The temperature profile of the extruder was between 260 and 280° C., and the extrusion speed was between 250 and 300 rpm under vacuum of 50-70 cmHg.

TABLE 1

| Components | Ex. 1 | Comp. Ex. 1 | Comp. Ex. 2 | Comp. Ex. 3 | Comp. Ex. 4 |
| --- | --- | --- | --- | --- | --- |
| PA66[1]    | 25.70 wt % | 25.70 wt % | 25.70 wt % | 25.70 wt % | 25.70 wt % |
| PA610[2]   | 39.00 wt % | 39.00 wt % | 39.00 wt % | 39.00 wt % | 39.00 wt % |
| GF[3]      | 33.00 wt % | 33.00 wt % | 33.00 wt % | 33.00 wt % | 33.00 wt % |
| CuI/KI[4]  | 0.60 wt % | 0.60 wt % | 0.60 wt % | 0.60 wt % | 0.60 wt % |
| Al stearate | 0.20 wt % | — | — | — | — |
| Zn stearate | — | 0.20 wt % | — | — | — |
| Mg stearate | — | — | 0.20 wt % | — | — |
| Ca stearate | — | — | — | 0.20 wt % | — |
| Stearic acid | — | — | — | — | 0.20 wt % |
| Additives | 1.50 wt % | 1.50 wt % | 1.50 wt % | 1.50 wt % | 1.50 wt % |

[1]Polyamide 6,6: STABAMID ® 25FS2 PA66 available from Solvay Polyamide & Intermediates (the amount of AEG = 102.4 meq/kg; the amount of CEG = 37.8 meq/kg);
[2]Polyamide 6,10: STABAMID ® 28CE2 available from Solvay Polyamide & Intermediates (viscosity number = 130 to 147 ml);
[3]Glass fibers: ECS 301X1 available from Chongqing Polycomp International Corp. (CPIC); and
[4]CuI/KI: MM8629F available from Solvay Chemicals Korea.

Example 3: Modified Denso—CaCl$_2$ Stress Cracking Resistance

Dumbbell specimens were subjected to cycles of 4 hours in a chamber at a pressure of 19 MPa and at a temperature of 100° C. An aqueous solution comprising 50 wt % of CaCl$_2$ was sprayed to the samples 3 times a day (5 ml/day). One of the ends of the samples was subjected to stress by a weight of 660 g.

The specimens prepared by Comp. Ex.1, Comp. Ex.2 and Comp. Ex.3 were broken after 1$^{st}$ cycle, whereas some minor surface cracks were observed from the specimens prepared by Ex.1 and Comp. Ex.4. Even after 2$^{nd}$ cycle, the specimens prepared by Ex.1 and Comp. Ex.4 were not broken.

Example 4: Resistance to Long Life Coolant (LLC) and Spiral Flow

The samples prepared with Ex.1 and Comp. Ex.4 were placed in an LLC containing 50 wt % of water and 50 wt % of ethylene glycol for 500 hours at 130° C. TS to break was measured according to ISO 527.

Spiral flow is an accurate indicator determining the flow properties of a thermoplastic resin. Such melt flow properties for injection molding were tested by using a spiral mold based on the distance it flowed along a spiral runner of constant cross section, under controlled conditions of pressure and temperature (290° C. at nozzle and 80° C. at mold).

The results were reported in Table 2 below.

TABLE 2

|  | Ex. 1 | Comp. Ex. 4 |
| --- | --- | --- |
| Spiral flow | 42.6 cm | 44.3 cm |
| TS to break (initial) | 175.7 MPa | 184.3 MPa |
| TS to break (after 500 hours) | 102.1 MPa | 95.6 MPa |
| TS to break (after 1000 hours) | 84.3 MPa | 78.6 MPa |
| Retention (after 500 hours) | 58.1% | 51.8% |
| Retention (after 1000 hours) | 48.2% | 42.6% |

It should be noted that Ex.1 of the present invention showed high retention of TS to break (58.1% after 500 hours and 48.2% after 1000 hours) compared to Comp. Ex.4, even though Comp. Ex.4 exhibited a bit better spiral flow than Ex.1, but the flowability of Ex.1 of the present invention still falls within the range appropriate for injection molding.

Example 5: Mechanical Properties

The unnotched Charpy impact strength of Ex.1 and Comp. Ex.4 was measured in accordance with the standard ISO 179. 97.8 KJ/m$^2$ was obtained for Ex.1, and 95.4 KJ/m$^2$ for Comp. Ex.1. In addition, other properties of elongation at break and tensile modulus (Young's modulus) were equivalent for the different formulations.

The above experimental results show that the polyamide composition according to the present invention (Ex.1), which comprises at least one reinforcing filler and Al stearate as lubricant, can exhibit better CaCl$_2$ salt crack resistance, while maintaining advantageous mechanical and thermal properties thereof at a time, compared to the comparative compositions (Comp. Ex. 1-4), which comprise Ca stearate, Mg stearate, Zn stearate, or stearic acid as lubricant.

The invention claimed is:

1. A polyamide composition comprising:
   (a) from 33.0 to 98.9 wt % of at least one polyamide mixture formed from:
      (i) from 13.0 to 38.9 wt % of at least one polyamide 6,6 having amine end groups and optionally carboxylic acid end groups, wherein the amount of amine end groups is greater than the amount of carboxylic acid end groups; and
      (ii) from 20.0 to 60.0 wt % of at least one aliphatic high chain-length polyamide;
   (b) from 1.0 to 60.0 wt % of at least one reinforcing filler;
   (c) from 0.05 to 3.0 wt % of at least one heat stabilizer;
   (d) from 0.05 to 1.0 wt % of aluminum stearate; and
   (e) from 0.1 to 2 wt % of at least one additive at least including a chain extender,
   wherein each amount of (a), (i), (ii), (b), (c), (d), and (e) is with respect to the total weight of the polyamide composition and the sum of wt % of (a) to (e) adds to 100 wt %,
   wherein the weight ratio of the polyamide 6,6 to the at least one aliphatic high chain-length polyamide within the polyamide mixture is about 4:6,
   and wherein
   an aliphatic high chain-length polyamide is an aliphatic polyamide comprising recurring units (R$_{PAL}$), at least 50% moles of said recurring units (R$_{PAL}$) complying with any of formula (I) or formula (II):

—NH—R$^1$—CO;    formula (I):

—NH—R$^2$—NH—CO—R$^3$—CO—,    formula (II):

wherein
   R$^1$, equal to or different from each other at each occurrence, is a divalent hydrocarbon group having from 6 to 17 carbon atoms
   and wherein R$^2$ and R$^3$, equal to or different from each other at each occurrence, are divalent hydrocarbon groups, with the proviso that at least one of following conditions is satisfied:
   R$^2$ has from 7 to 18 carbon atoms; and
   R$^3$ has from 5 to 16 carbon atoms,
   or
   wherein an aliphatic high chain-length polyamide is an aliphatic polyamide comprising recurring units (R$_{PAL}$) of the polyamide which are obtained through polycondensation reaction of one of pimelic acid [HOOC—(CH$_2$)$_5$—COOH], suberic acid HOOC—(CH$_2$)$_6$—COOH], azelaic acid [HOOC—(CH$_2$)$_7$—COOH], sebacic acid [HOOC—(CH$_2$)$_8$—COOH], undecanedioic acid [HOOC—(CH$_2$)$_9$—COOH], dodecandioic acid [HOOC—(CH$_2$)$_{10}$—COOH], tetradecandioic acid [HOOC—(CH$_2$)$_{12}$—COOH], octadecandioic acid [HOOC—(CH$_2$)$_{16}$—COOH] with one of 1,6-diaminohexane, 1,6-diamino-2,5-dimethylhexane, 1,6-diamino-2,4-dimethylhexane, 1,6-diamino-3,3-dimethylhexane, 1,6-diamino-2,2-dimethylhexane, 1,6-diamino-2,2,4-trimethylhexane, 1,6-diamino-2,4,4-trimethylhexane, and 1,6-diamino-2,4-diethylhexane.

2. The polyamide composition according to claim 1, wherein the at least one aliphatic high chain-length polyamide is selected from the group consisting of polyamide 11, polyamide 12, polyamide 6,10, polyamide 6,12, polyamide 6,18, polyamide 10,10, polyamide 10,12, polyamide 12,12, and mixtures thereof.

3. The polyamide composition according to claim 1, wherein the amount of amine end groups of the polyamide 6,6 is greater than or equal to 50 meq/kg and the difference between the amount of amine end groups and the amount of carboxylic acid end groups in the polyamide 6,6 is greater than or equal to 5 meq/kg.

4. The polyamide composition according to claim 1, wherein the at least one reinforcing filler is selected from the group consisting of glass fibers, glass beads, calcium carbonate, silicates, talc, kaolin, mica, wood powders, and powders and fibers of other natural products, and synthetic fibers.

5. The polyamide composition according to claim 1, wherein the at least one heat stabilizer is formed from CuI/KI in a molar ratio of CuI to KI of about 1:5.

6. The polyamide composition according to claim 1, wherein the at least one heat stabilizer is a combination of a hindered phenol compound and a phosphorous compound.

7. The polyamide composition according to claim 1, further comprising one or more additive selected from the group consisting of antioxidant, UV stabilizer, colorant, dye, plasticizer, and any combinations thereof.

8. The polyamide composition according to claim 1, wherein an amount of the at least one polyamide mixture is from 50.0 to 70.0 wt % with respect to the total weight of the polyamide composition.

9. The polyamide composition according to claim 1, wherein an amount of the at least one reinforcing filler is from 29.3 to 46.0 wt % with respect to the total weight of the polyamide composition.

10. The polyamide composition according to claim 1, wherein an amount of the at least one heat stabilizer is from 0.1 to 2.0 wt % with respect to the total weight of the polyamide composition.

11. The polyamide composition according to claim 1, wherein an amount of aluminum stearate is from 0.1 to 0.5 wt % with respect to the total weight of the polyamide composition.

12. The polyamide composition according to claim 1, wherein an amount of the at least one additive is from 0.5 to 1.5 wt % with respect to the total weight of the polyamide composition.

13. A method for producing an article that exhibits enhanced chemical resistance, comprising molding a polyamide composition to form the article, wherein the polyamide composition comprises:
(a) from 33.0 to 98.9% wt % of at least one polyamide mixture formed from:
  (i) from 13.0 to 38.9 wt % of at least one polyamide 6,6 having amine end groups and optionally carboxylic acid end groups, wherein the amount of amine end groups is greater than the amount of carboxylic acid end groups; and
  (ii) from 20.0 to 60.0 wt % of at least one aliphatic high chain-length polyamide;
(b) from 1.0 to 60.0 wt % of at least one reinforcing filler;
(c) from 0.05 to 3.0 wt % of at least one heat stabilizer;
(d) from 0.05 to 1.0 wt % of aluminum stearate; and
(e) from 0.1 to 2 wt % of at least one additive at least including a chain extender,
wherein each amount of (a), (i), (ii), (b), (c), (d), and (e) is with respect to the total weight of the polyamide composition and the sum of wt % of (a) to (e) adds to 100 wt %,
wherein the weight ratio of the polyamide 6,6 to the at least one aliphatic high chain-length polyamide within the polyamide mixture is about 4:6,
and wherein
an aliphatic high chain-length polyamide is an aliphatic polyamide comprising recurring units ($R_{PAL}$), at least 50% moles of said recurring units ($R_{PAL}$) complying with any of formula (I) or formula (II):

$$—NH—R^1—CO; \qquad \text{formula (I):}$$

$$—NH—R^2—NH—CO—R^3—CO—, \qquad \text{formula (II):}$$

wherein
$R^1$, equal to or different from each other at each occurrence, is a divalent hydrocarbon group having from 6 to 17 carbon atoms
and wherein $R^2$ and $R^3$, equal to or different from each other at each occurrence, are divalent hydrocarbon groups, with the proviso that at least one of following conditions is satisfied:
$R^2$ has from 7 to 18 carbon atoms; and
$R^3$ has from 5 to 16 carbon atoms,
or
wherein an aliphatic high chain-length polyamide is an aliphatic polyamide comprising recurring units ($R_{PAL}$) of the polyamide which are obtained through polycondensation reaction of one of pimelic acid [HOOC—$(CH_2)_5$—COOH], suberic acid HOOC—$(CH_2)_6$—COOH], azelaic acid [HOOC—$(CH_2)_7$—COOH], sebacic acid [HOOC—$(CH_2)_8$—COOH], undecanedioic acid [HOOC—$(CH_2)_9$—COOH], dodecandioic acid [HOOC—$(CH_2)_{10}$—COOH], tetradecandioic acid [HOOC—$(CH_2)_{12}$—COOH], octadecandioic acid [HOOC—$(CH_2)_{16}$—COOH] with one of 1,6-diaminohexane, 1,6-diamino-2,5-dimethylhexane, 1,6-diamino-2,4-dimethylhexane, 1,6-diamino-3,3-dimethylhexane, 1,6-diamino-2,2-dimethylhexane, 1,6-diamino-2,2,4-trimethylhexane, 1,6-diamino-2,4,4-trimethylhexane, and 1,6-diamino-2,4-diethylhexane.

14. An article comprising a polyamide composition, wherein the polyamide composition comprises:
(a) from 33.0 to 98.9% wt % of at least one polyamide mixture formed from:
  (i) from 13.0 to 38.9 wt % of at least one polyamide 6,6 having amine end groups and optionally carboxylic acid end groups, wherein the amount of amine end groups is greater than the amount of carboxylic acid end groups; and
  (ii) from 20.0 to 60.0 wt % of at least one aliphatic high chain-length polyamide;
(b) from 1.0 to 60.0 wt % of at least one reinforcing filler;
(c) from 0.05 to 3.0 wt % of at least one heat stabilizer;
(d) from 0.05 to 1.0 wt % of aluminum stearate; and
(e) from 0.1 to 2 wt % of at least one additive at least including a chain extender,
wherein each amount of (a), (i), (ii), (b), (c), (d), and (e) is with respect to the total weight of the polyamide composition and the sum of wt % of (a) to (e) adds to 100 wt %,
wherein the weight ratio of the polyamide 6,6 to the at least one aliphatic high chain-length polyamide within the polyamide mixture is about 4:6,
and wherein
an aliphatic high chain-length polyamide is an aliphatic polyamide comprising recurring units ($R_{PAL}$), at least 50% moles of said recurring units ($R_{PAL}$) complying with any of formula (I) or formula (II):

$$—NH—R^1—CO; \qquad \text{formula (I):}$$

$$—NH—R^2—NH—CO—R^3—CO—, \qquad \text{formula (II):}$$

wherein

R¹, equal to or different from each other at each occurrence, is a divalent hydrocarbon group having from 6 to 17 carbon atoms and wherein R² and R³, equal to or different from each other at each occurrence, are divalent hydrocarbon groups, with the proviso that at least one of following conditions is satisfied:

R² has from 7 to 18 carbon atoms; and
R³ has from 5 to 16 carbon atoms, or wherein an aliphatic high chain-length polyamide is an aliphatic polyamide comprising recurring units ($R_{PAL}$) of the polyamide which are obtained through polycondensation reaction of one of pimelic acid [HOOC—$(CH_2)_5$—COOH], suberic acid HOOC—$(CH_2)_6$—COOH], azelaic acid [HOOC—$(CH_2)_7$—COOH], sebacic acid [HOOC—$(CH_2)_8$—COOH], undecandioic acid [HOOC—$(CH_2)_9$—COOH], dodecandioic acid [HOOC—$(CH_2)_{10}$—COOH], tetradecandioic acid [HOOC—$(CH_2)_{12}$—COOH], octadecandioic acid [HOOC—$(CH_2)_{16}$—COOH] with one of 1,6-diaminohexane, 1,6-diamino-2,5-dimethylhexane, 1,6-diamino-2,4-dimethylhexane, 1,6-diamino-3,3-dimethylhexane, 1,6-diamino-2,2-dimethylhexane, 1,6-diamino-2,2,4-trimethylhexane, 1,6-diamino-2,4,4-trimethylhexane, and 1,6-diamino-2,4-diethylhexane.

15. The article according to claim 14, wherein the article is an automobile radiator end tank.

16. A method for enhancing salt crack resistance of a polyamide composition at least comprising:
(a) from 33.0 to 98.9% wt % of at least one polyamide mixture formed from:
(i) from 13.0 to 38.9 wt % of at least one polyamide 6,6 having amine end groups and optionally carboxylic acid end groups, wherein the amount of amine end groups is greater than the amount of carboxylic acid end groups; and
(ii) from 20.0 to 60.0 wt % of at least one aliphatic high chain-length polyamide; and
(b) from 1.0 to 60.0 wt % of at least one reinforcing filler;

wherein each amount of (a), (i), (ii), and (b) is with respect to the total weight of the polyamide composition and the sum of wt % of (a) to (b) adds to 100 wt %, wherein the weight ratio of the polyamide 6,6 to the at least one aliphatic high chain-length polyamide within the polyamide mixture is about 4:6, and wherein an aliphatic high chain-length polyamide is an aliphatic polyamide comprising recurring units ($R_{PAL}$), at least 50% moles of said recurring units ($R_{PAL}$) complying with any of formula (I) or formula (II):

$$—NH—R^1—CO; \qquad \text{formula (I):}$$

$$—NH—R^2—NH—CO—R^3—CO—, \qquad \text{formula (II):}$$

wherein

R¹, equal to or different from each other at each occurrence, is a divalent hydrocarbon group having from 6 to 17 carbon atoms and wherein R² and R³, equal to or different from each other at each occurrence, are divalent hydrocarbon groups, with the proviso that at least one of following conditions is satisfied:

R² has from 7 to 18 carbon atoms; and
R³ has from 5 to 16 carbon atoms, or wherein an aliphatic high chain-length polyamide is an aliphatic polyamide comprising recurring units ($R_{PAL}$) of the polyamide which are obtained through polycondensation reaction of one of pimelic acid [HOOC—$(CH_2)_5$—COOH], suberic acid HOOC—$(CH_2)_6$—COOH], azelaic acid [HOOC—$(CH_2)_7$—COOH], sebacic acid [HOOC—$(CH_2)_8$—COOH], undecandioic acid [HOOC—$(CH_2)_9$—COOH], dodecandioic acid [HOOC—$(CH_2)_{10}$—COOH], tetradecandioic acid [HOOC—$(CH_2)_{12}$—COOH], octadecandioic acid [HOOC—$(CH_2)_{16}$—COOH] with one of 1,6-diaminohexane, 1,6-diamino-2,5-dimethylhexane, 1,6-diamino-2,4-dimethylhexane, 1,6-diamino-3,3-dimethylhexane, 1,6-diamino-2,2-dimethylhexane, 1,6-diamino-2,2,4-trimethylhexane, 1,6-diamino-2,4,4-trimethylhexane, and 1,6-diamino-2,4-diethylhexane, the method comprising adding aluminum stearate to the polyamide composition.

17. The polyamide composition according to claim 2, wherein the at least one aliphatic high chain-length polyamide comprises polyamide 6,10.

18. The method of claim 13, wherein the chemical resistance comprises resistance to $CaCl_2$) salt cracking.

19. A polyamide composition comprising:
(a) from 33.0 to 98.9% wt % of at least one polyamide mixture formed from:
(i) from 13.0 to 38.9 wt % of at least one polyamide 6,6 having amine end groups and optionally carboxylic acid end groups, wherein the amount of amine end groups is greater than the amount of carboxylic acid end groups; and
(ii) from 20.0 to 60.0 wt % of at least one aliphatic high chain-length polyamide;
(b) from 1.0 to 60.0 wt % of at least one reinforcing filler;
(c) from 0.05 to 3.0 wt % of at least one heat stabilizer;
(d) from 0.05 to 1.0 wt % of aluminum stearate; and
(e) from 0.1 to 2 wt % of at least one additive, wherein each amount of (a), (i), (ii), (b), (c), (d), and (e) is with respect to the total weight of the polyamide composition and the sum of wt % of (a) to (e) adds to 100 wt %, wherein the weight ratio of the polyamide 6,6 to the at least one aliphatic high chain-length polyamide within the polyamide mixture is about 4:6, and wherein an aliphatic high chain-length polyamide is an aliphatic polyamide comprising recurring units ($R_{PAL}$), at least 50% moles of said recurring units ($R_{PAL}$) complying with any of formula (I) or formula (II):

$$—NH—R^1—CO; \qquad \text{formula (I):}$$

$$—NH—R^2—NH—CO—R^3—CO—, \qquad \text{formula (II):}$$

wherein

R¹, equal to or different from each other at each occurrence, is a divalent hydrocarbon group having from 6 to 17 carbon atoms and wherein R² and R³, equal to or different from each other at each occurrence, are divalent hydrocarbon groups, with the proviso that at least one of following conditions is satisfied:

R² has from 7 to 18 carbon atoms; and
R³ has from 5 to 16 carbon atoms, or wherein an aliphatic high chain-length polyamide is an aliphatic polyamide comprising recurring units ($R_{PAL}$) of the polyamide which are obtained through polycondensation reaction of one of pimelic acid [HOOC—$(CH_2)_5$—COOH], suberic acid HOOC—$(CH_2)_6$—COOH], azelaic acid [HOOC—$(CH_2)_7$—COOH], sebacic acid [HOOC—$(CH_2)_8$—COOH], undecanedioic acid [HOOC—$(CH_2)_9$—COOH], dodecandioic acid [HOOC—$(CH_2)_{10}$—COOH], tetradecandioic acid [HOOC—$(CH_2)_{12}$—COOH], octadecandioic acid [HOOC—$(CH_2)_{16}$—COOH] with one of 1,6-diaminohexane, 1,6-diamino-2,5-dimethylhexane, 1,6-diamino-2,4-dimethylhexane, 1,6-diamino-3,3-dimethylhexane, 1,6-diamino-2,2-dimethylhexane, 1,6-diamino-2,2,4-trimethylhexane, 1,6-diamino-2,4,4-trimethylhexane, and 1,6-diamino-2,4-diethylhexane.

\* \* \* \* \*